United States Patent
Jeong et al.

(10) Patent No.: US 10,173,469 B2
(45) Date of Patent: Jan. 8, 2019

(54) POLYMER FILMS

(71) Applicant: KOLON INDUSTRIES, INC., Gwacheon (KR)

(72) Inventors: Young-Han Jeong, Yongin (KR); So-Yeon Kwon, Yongin (KR); Il Chung, Yongin (KR); Hyun Namgoong, Yongin (KR)

(73) Assignee: KOLON INDUSTRIES, INC., Gwacheon-si (KR)

(*) Notice: Subject to any disclaimer, the term of this patent is extended or adjusted under 35 U.S.C. 154(b) by 0 days.

(21) Appl. No.: 14/894,386

(22) PCT Filed: May 27, 2014

(86) PCT No.: PCT/KR2014/004729
§ 371 (c)(1),
(2) Date: Nov. 27, 2015

(87) PCT Pub. No.: WO2014/193146
PCT Pub. Date: Dec. 4, 2014

(65) Prior Publication Data
US 2016/0107483 A1  Apr. 21, 2016

(30) Foreign Application Priority Data

May 27, 2013 (KR) .................. 10-2013-0059969
May 26, 2014 (KR) .................. 10-2014-0063172

(51) Int. Cl.
  *B32B 7/02* (2006.01)
  *B60C 5/14* (2006.01)
  (Continued)

(52) U.S. Cl.
  CPC .............. *B60C 5/14* (2013.01); *B60C 1/0008* (2013.01); *C08G 69/40* (2013.01); *C08L 9/08* (2013.01);
  (Continued)

(58) Field of Classification Search
  CPC .................. B60C 1/0008; C08J 5/18; C08J 2377/00–2377/02; C08J 2423/26;
  (Continued)

(56) References Cited

U.S. PATENT DOCUMENTS 5,239,004 A * 8/1993 Pyke .................. C08K 5/372
  525/179
2008/0047646 A1 * 2/2008 Hong .................. B60C 1/0008
  152/510

(Continued)

FOREIGN PATENT DOCUMENTS

KR  10-2001-0038924  5/2001
KR  10-2002-0052509  7/2002
(Continued)

OTHER PUBLICATIONS

Tadmore et. al, Principles of Polymer Processing, 2006, Wiley-Interscience, 2nd Edition, Chapter 3.1.*
(Continued)

*Primary Examiner* — Maria V Ewald
*Assistant Examiner* — Zachary M Davis
(74) *Attorney, Agent, or Firm* — Lex IP Meister, PLLC

(57) ABSTRACT

There is provided a polymer film which includes: a base film layer including a polyamide-based resin having a particular relative viscosity and a copolymer including a polyamide-based segment and a polyether-based segment having a specific content; and an adhesive layer formed on at least one side of the base film layer, wherein a ratio of the melt viscosity of the copolymer to the melt viscosity of the polyamide resin is 0.65 to 1.2 at a shear rate of 1000 s$^{-1}$ and a temperature of 260° C.

15 Claims, 1 Drawing Sheet

(51) Int. Cl.
- *C09J 161/12* (2006.01)
- *C08G 69/40* (2006.01)
- *C09J 109/08* (2006.01)
- *C08L 77/02* (2006.01)
- *B60C 1/00* (2006.01)
- *C09J 7/25* (2018.01)
- *C08L 9/08* (2006.01)
- *C08L 61/12* (2006.01)

(52) U.S. Cl.
CPC .............. *C08L 61/12* (2013.01); *C08L 77/02* (2013.01); *C09J 7/25* (2018.01); *C09J 109/08* (2013.01); *C09J 161/12* (2013.01); *B60C 2005/145* (2013.01); *C09J 2201/622* (2013.01); *C09J 2461/00* (2013.01); *C09J 2471/006* (2013.01); *C09J 2477/006* (2013.01)

(58) Field of Classification Search
CPC .................. C08J 2477/02; C09J 161/12; C09J 2201/122; C09J 2201/622; C09J 2453/006; C09J 2461/00; C09J 2471/06; C09J 2477/06; C08L 77/00

See application file for complete search history.

(56) References Cited

U.S. PATENT DOCUMENTS

| | | | | |
|---|---|---|---|---|
| 2008/0274355 | A1* | 11/2008 | Hewel | C08G 69/265 428/402 |
| 2011/0024015 | A1* | 2/2011 | Takahashi | B60C 1/0008 152/510 |
| 2011/0060082 | A1* | 3/2011 | Sugimoto | C08L 53/00 524/262 |
| 2011/0068508 | A1* | 3/2011 | Sugimoto | B29D 30/0681 264/326 |
| 2012/0301652 | A1* | 11/2012 | Kawaguchi | C08L 77/02 428/36.91 |
| 2013/0101821 | A1* | 4/2013 | Jeon | B60C 5/14 428/215 |
| 2013/0192736 | A1* | 8/2013 | Song | C09J 161/12 152/510 |
| 2013/0199686 | A1* | 8/2013 | Chung | B60C 1/0008 152/510 |
| 2016/0032053 | A1* | 2/2016 | Kato | C08G 69/40 428/220 |

FOREIGN PATENT DOCUMENTS

| | | | |
|---|---|---|---|
| KR | 10-2005-0088660 | 9/2005 | |
| KR | 10-2011-0120885 | 11/2011 | |
| KR | 10-2013-0035975 | 4/2013 | |
| WO | WO 2012002750 A2 * | 1/2012 | ............... B60C 5/14 |

OTHER PUBLICATIONS

Machine Translation of WO 2012/002750.*
International Standard ISO 307:2007, 5th edition, May 15, 2007, pp. 1-4, 23, 27, 31.*
Search Report & Written Opinion, Patent Cooperation Treaty, dated Sep. 1, 2014, application No. PCT/KR2014/004729.

* cited by examiner

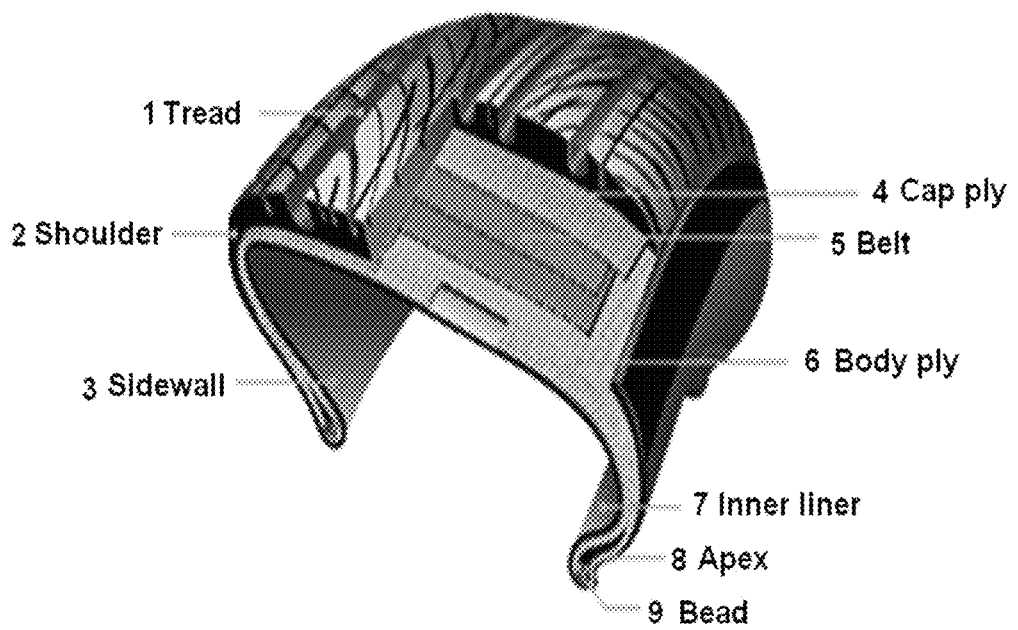

POLYMER FILMS

TECHNICAL FIELD

There is provided a polymer film. More particularly, there is provided a polymer film which exhibits uniform physical properties in the entire area of the polymer film, endows an excellent gas barrier property even to tires having a relatively thin thickness so that weight of the tire can be reduced when it is used for an inner liner film, improves fuel efficiency of automobiles, and has excellent mechanical properties such as high durability and fatigue resistance together with excellent moldability.

BACKGROUND OF THE INVENTION

A tire serves to withstand the load of automobiles, to reduce impact with a road surface, and to transfer a driving force or braking force of an automobile to the ground. In general, the tire refers to a complex of fiber/steel/rubber and normally has a structure as shown in FIG. 1.

Tread (1): a portion that is in contact with the road surface. It should afford frictional force required for driving and braking, have good wear resistance, withstand external impact, and have minimal heat generation.

Body ply (or carcass) (6): a cord layer inside the tire. It should support a load, withstand impact, and have strong fatigue resistance to bending and stretching while the vehicle is running.

Belt (5): located between the body plies. It consists of steel wire in most cases, reduces external impact, and maintains a large area of contact of the ground to the surface of the tread to afford excellent vehicle running stability.

Side wall (3): a rubber layer between a part below a shoulder (2) and a bead (9). It serves to protect the inner body ply (6).

Inner liner (7): located inside the tire instead of a tube. It prevents air leakage to enable a pneumatic tire.

Bead 9: square or hexagonal wire bundle formed of rubber-coated steel wire. It serves to stabilize and fix the tire in a rim.

Cap ply (4): a special cord located on a belt of a radial tire for some passenger cars. It minimizes movement of the belt during automobile running.

Apex (8): triangular rubber filler used to minimize dispersion of the bead, reduce external impact to protect the bead, and prevent air inflow during molding.

Recently, a tubeless tire in which high pressure air of about 30~40 psi is injected without using a tube has become widely used. In order to prevent inside air from leaking outside during automobile running, an inner liner having a high gas barrier property is disposed in an inner layer of the carcass.

Previously, a tire inner liner consisting mainly of rubber components such as butyl rubber or halobutyl rubber having relatively low air permeability was used, but in order to achieve a sufficient gas barrier property of the inner liner, the content of the rubber components and the thickness of the inner liner should be increased.

However, if the content of the rubber components and the thickness of the tire are increased, there are problems in that the total weight of the tire is increased and the fuel efficiency of automobiles is lowered.

Moreover, since the rubber components have relatively low heat resistance, there were problems in that air pockets may be generated between rubber in the inner surface of a carcass layer and an inner liner, or the shape or physical properties of the inner liner may be changed in a vulcanization process of a tire or in an automobile running process during which repeated deformations occur under a high temperature condition.

In addition, in order to adhere the rubber components to a carcass layer of a tire, a vulcanizing agent should be used or a vulcanization process should be applied. For this, it was difficult to secure sufficient adhesion force.

Accordingly, various methods have been suggested to decrease the thickness and weight of the inner liner to increase fuel efficiency, reduce changes in the shape or physical properties of the liner during tire molding or automobile running, and the like.

However, previously known methods have limitations in maintaining excellent air permeability and tire moldability while sufficiently reducing the thickness and weight of the inner liner.

Moreover, the inner liner manufactured by the previously known methods exhibited reduction of its own physical properties, and had cracks generated in the film and the like in the tire preparation process during which repeated deformations occur at a high temperature or in an automobile running process during which repeated deformations occur and high heat is generated.

DETAILED DESCRIPTION OF THE INVENTION

Technical Objectives

It is an object to provide a polymer film which exhibits uniform physical properties in the entire area of the polymer film, endows an excellent gas barrier property even to tires having a relatively thin thickness so that weight of the tire can be reduced when it is used for an inner liner film, improves fuel efficiency of automobiles, and has excellent mechanical properties such as high durability and fatigue resistance together with excellent moldability.

Technical Solutions

There is provided a polymer film which includes: a base film layer including a polyamide-based resin having a relative viscosity (96% sulfuric acid solution) of 3.0 to 3.5; and a copolymer including a polyamide-based segment and a polyether-based segment; and an adhesive layer, formed on at least one side of the base film layer and containing a resorcinol-formalin-latex (RFL)-based adhesive, wherein the content of the polyether-based segment of the copolymer is more than 2% by weight and less than 15% by weight with respect to the total weight of the base film layer, and wherein the ratio of the melt viscosity of the copolymer to the melt viscosity of the polyimide resin is 0.60 to 1.2 at a shear rate of 1000 $s^{-1}$ and a temperature of 260° C.

The polymer film according to specific embodiments will now be described in more detail.

The present inventors conducted extensive research and found that the polymer film including a base film layer formed using the polyamide-based resin and the copolymer containing a polyamide-based segment with a specific content can endow an excellent gas barrier property even to tires having a relatively thin thickness so that weight of the tire can be reduced when it is used for an inner liner film, improve the fuel efficiency of automobiles, and impart excellent moldability and mechanical properties while having high heat resistance, and can be firmly coupled to the tire even without applying an additional vulcanization process or significantly increasing the thickness of the adhesive layer.

In particular, during the preparation of the base film layer, by selecting and using a copolymer including a polyether-based segment with a particular content together with the polyamide-based resin having a particular relative viscosity, the two components can be uniformly mixed or combined without phase separation, and the manufactured base film layer may have uniform physical properties over the entire area thereof.

The base film layer thus manufactured has a modulus that is not excessively high and also has physical properties such as high elasticity or elastic recovery. Thus, the base film layer can not only exhibit excellent moldability in a tire manufacturing process, but can also prevent a phenomenon in which the film itself is crystallized or damage such as cracks occur in the inside of the film in a tire manufacturing process which causes great deformations under high temperature conditions or in the automobile running process during which repeated deformations occur.

Further, the above polyamide-based resin and the above copolymer containing polyamide-based segments and polyether-based segments may have no big difference in the ratio of the melt viscosity even in high temperature ranges and particular shear rates applied during the preparation of the base film layer.

Thus, in the course of melting and mixing the above polyamide-based resin and the copolymer including polyamide-based segments and polyether-based segments, the phenomenon in which the two different components are unevenly mixed can be minimized, the portion that may lead to a molding failure in a tire manufacturing process can be minimized, and the phase separation cannot occur even in a durability test after a tire molding, thereby minimizing the occurrence of a crack on the film.

Specifically, the ratio of the melt viscosity of the copolymer to the melt viscosity of the polyamide-based resin may be 0.60 to 1.2 at a shear rate of 1000 $s^{-1}$ and a temperature of 260° C.

The shear rate of 1000 $s^{-1}$ and the temperature of 260° C. may be conditions which can be applied in the process of mixing the polyamide segments and the copolymer containing polyamide-based segments and polyether-based segments.

On the other hand, the ratio of the melt viscosity of the copolymer to the melt viscosity of the polyamide-based resin may be 0.60 to 2.0 at the shear rate of 100 $s^{-1}$ and the temperature of 260° C.

If the melt viscosity of the above copolymer is greatly increased as compared with the melt viscosity of the polyamide-based resin in a state where the rate of flow caused by the shear stress is low, specifically if the melt viscosity of the above copolymer is in excess of twice as compared with the melt viscosity of the polyamide-based resin at the shear rate of 100 $s^{-1}$ and the temperature of 260° C., mixing of the polyamide-based resin and the copolymer is not easy and the physical properties of the base film to be manufactured may be greatly reduced.

In addition, even when the melt viscosity of the copolymer is much less as compared with the melt viscosity of the polyamide-based resin, likewise, mixing of the polyamide-based resin and the copolymer is not easy and the physical properties of the base film to be manufactured may be greatly reduced.

Further, the ratio of the melt viscosity of the copolymer to the melt viscosity of the polyamide-based resin may be 0.60 to 1.1 at the shear rate of 2000 $s^{-1}$ and the temperature of 260° C., and it may be 0.7 to 1.5 at the shear rate of 500 $s^{-1}$ and the temperature of 260° C.

In other words, by selecting the copolymer containing polyamide-based segments and polyether-based segments together with the polyamide-based resin having a particular relative viscosity and specifying the content of the polyether-based segments in the above copolymer, the polyamide-based resin and the copolymer may have similar melting properties to each other in the melting and extrusion steps, and they may be mixed and melted without agglomeration between the respective components or phase separation between the different components.

The above melt viscosity refers to a melt viscosity measured using a product extruded through an orifice at a prescribed temperature during film processing.

Since the melt viscosity of the manufactured product is dependent on a temperature range, a shear rate, and a shear stress, it may be obtained by measuring the stress and shear rate of the polymer in the temperature range that the melted product is extruded and then applying it to the following Equation 1.

$$\eta = \sigma/\gamma \qquad \text{[Equation 1]}$$

In Equation 1, $\eta$ is a melt viscosity, $\sigma$ is a shear stress, and $\gamma$ is a shear rate.

As described above, the polymer film in accordance with one embodiment may be used as a tire inner liner.

The polyamide-based resin may have a relative viscosity (96% sulfuric acid solution) of 3.0 to 3.5, and preferably 3.2 to 3.4.

If the viscosity of the polyamide-based resin is less than 3.0, sufficient elongation may not be obtained due to a decrease in toughness, and thus damage may be generated in a tire manufacturing process or automobile running process, and the ratio of the melt viscosity of the copolymer to the melt viscosity of the polyamide-based resin at the temperature of 260° C. and the entire shear rate area may be greatly increased. Therefore, the polyamide-based resin and the copolymer may be phase-separated from each other in the manufacturing process of the base film layer, in the manufacturing process of the film or in the automobile running process. Further, it may be difficult for the base film layer to secure physical properties such as gas barrier property, moldability, and the like required for a tire inner liner.

Further, if the viscosity of the polyamide-based resin exceeds 3.5, the modulus or viscosity of the base film layer to be manufactured may be unnecessarily high, and it may be difficult for a tire inner liner to have proper moldability or elasticity.

The relative viscosity of the polyamide-based resin refers to a relative viscosity measured using a 96% sulfuric acid solution at room temperature.

Specifically, a specimen of a certain polyamide-based resin (for example, a 0.025 g specimen) is dissolved in a 96% sulfuric acid solution at various concentrations to prepare two or more measurement solutions (for example, a polyamide-based resin specimen is dissolved in 96% sulfuric acid to a concentration of 0.25 g/dL, 0.10 g/dL, and 0.05 g/dL to prepare three measurement solutions), and then the relative viscosity of the measurement solutions (for example, the ratio of the average passing time of the measurement solutions to the passing time of the 96% sulfuric acid solution through a viscosity tube) may be obtained using a viscosity tube at 25° C.

The above-described polymer films have an excellent gas barrier property and high internal pressure retention performance, and may also have physical properties such as excellent moldability and high fatigue resistance.

It appears that the excellent physical properties of these polymer films result from the use of the base film layer prepared using the polyamide-based resin having a particular relative viscosity and the copolymer containing a specific content of polyether-based segments and polyamide-based segments.

Specifically, the base film layer uses a copolymer including a specific content of polyether-based segments which endow an elastomeric property to the polyamide-based resin, and thus it may exhibit an excellent gas barrier property and a relatively low modulus.

The polyamide-based resin included in the base film layer exhibits an excellent gas barrier property of, for example, 10 to 20 times higher than that of butyl rubber and the like commonly used in tires of the same thickness, due to the intrinsic molecular chain property, and exhibits a low modulus property compared to other resins.

Further, the polyether-based segments contained in the copolymer is present in a state of being bonded or distributed between the polyamide-based segments or polyamide-based resins, and thus they can further lower the modulus of the base film layer, inhibit an increase in the stiffness of the base film layer, and prevent the base film layer from being crystallized at a high temperature.

Specifically, the base film layer may have a thickness of 30 to 300 µm, preferably 40 to 250 µm, and more preferably 40 to 200 µm.

Thus, the polymer film according to one embodiment may have low air permeability, for example oxygen permeability of not more than 200 cc/(m$^2 \cdot$24 h·atm), while having a thinner thickness as compared with the previously known one.

The polyamide-based resin which can be used in the base film layer includes, for example, nylon 6, nylon 66, nylon 46, nylon 11, nylon 12, nylon 610, nylon 612, a copolymer of nylon 6/66, a copolymer of nylon 6/66/610, nylon MXD6, nylon 6T, a copolymer of nylon 6/6T, a copolymer of nylon 66/PP, and a copolymer of nylon 66/PPS; or an N-alkoxy alkylate thereof, for example, a methoxy methylate of 6-nylon, a methoxy methylate of 6-610-nylon, or a methoxy methylate of 612-nylon, and nylon 6, nylon 66, nylon 46, nylon 11, nylon 12, nylon 610, and nylon 612 may be preferably used.

In the course of manufacturing the base film, the polyamide-based resin may be included in the base film by mixing with the above-described copolymer and melting it. Also, the precursor monomer or oligomer and the like of the polyamide-based resin may be included in the base film by mixing with the above-described copolymer together with the reaction initiator or catalyst and conducting a reaction.

Meanwhile, as described above, the copolymer containing polyamide-based segments and polyether-based segments is present in a state of being coupled or distributed between the polyamide-based resins, and thus they can further lower the modulus of the base film layer, inhibit an increase in the stiffness of the base film layer, and prevent the base film layer from being crystallized at a high temperature.

By including such a copolymer in the base film layer, the polymer film can achieve high elasticity or elastic recovery even while securing mechanical properties such as excellent durability, heat resistance, fatigue resistance, and the like.

Therefore, the polymer film can exhibit excellent moldability, and the tire to which it is applied may not be physically damaged or have its own physical properties or performance lowered in an automobile running process during which repeated deformation and high heat are continuously generated.

Meanwhile, the content of the polyether-based segments of the copolymer may be more than 2% by weight and less than 15% by weight, preferably 3% to 14% by weight, and more preferably 5% to 13% by weight, based on the total weight of the base film layer.

When the content of the polyether-based segments is excessively lowered in the overall base film layer, the modulus of the base film layer or polymer film is increased and thus the moldability of the tire is lowered or the physical properties due to repeated deformation may be greatly lowered.

When the content of the polyether-based segments is excessively increased in the overall base film layer, the gas barrier property of the polymer film may be lowered, and the reactivity to the adhesive is reduced and thus it may be difficult for an inner liner to easily bond to a carcass layer. In addition, the elasticity of the base film layer is increased and thus manufacture of the uniform film may not be easy.

Based on the total weight of the base film layer, when the content of the polyether-based segments of the copolymer exceeds the range described above, that is, when the content of the polyether-based segments is too small or too large in the above-mentioned copolymer, the melt viscosity of the polyamide-based resin and the melt viscosity of the copolymer may be significantly different. Therefore, two different components are non-uniformly mixed or combined in the process of mixing and melting the polyamide-based resin and the copolymer and thus phase separation or cracks may be generated within the base film to be manufactured.

The copolymer containing polyamide-based segments and polyether-based segments may be a copolymer produced by reacting the polyamide-based monomer or oligomer and polyether-based monomer or oligomer. It may also be a copolymer obtained through a polymerization reaction or cross-linkage reaction between a polymer containing polyamide-based segments and a polymer containing polyether-based segments.

The copolymer containing polyamide-based segments and polyether-based segments may be a block copolymer that is linked so that the segments form a block. It may also be a random copolymer in which the segments are irregularly linked.

The copolymer containing polyamide-based segments and polyether-based segments may be a copolymer including a polymerization reaction product between a polymer including polyamide-based segments and a polymer including polyether-based segments. It may also be a cross-linked copolymer containing a cross-linking reaction product between a polymer including polyether-based segments and a polymer including polyether-based segments.

Meanwhile, in the above-described base film layer, the polyamide-based resin and the copolymer containing polyamide-based segments and polyether-based segments may be uniformly mixed or they may be in a state of being linked in a part or an entire area of the film layer through a polymerization reaction or cross-linkage reaction.

The polyether-based segments are either combined with the polyamide-based segments, or can be present in a state of being dispersed between the polyamide-based resins. In the tire manufacturing process or the automobile running process, it is possible to inhibit growing of the crystals in the base film layer or to prevent the base film layer from being easily broken.

The polyamide-based segment may include a repeating unit of the following Chemical Formula 1 or Chemical Formula 2.

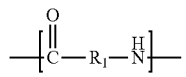
[Chemical Formula 1]

In Chemical Formula 1, $R_1$ is a linear or branched alkylene group having 1 to 20 carbon atoms, an arylene group having 6 to 20 carbon atoms, or a linear or branched arylalkylene group having 7 to 20 carbon atoms.

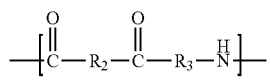
[Chemical Formula 2]

In Chemical Formula 2, $R_2$ is a linear or branched alkylene group having 1 to 20 carbon atoms, and $R_3$ is a linear or branched alkylene group having 1 to 20 carbon atoms, an arylene group having 6 to 20 carbon atoms, or a linear or branched arylalkylene group having 7 to 20 carbon atoms.

Further, the polyether-based segment of the copolymer ray include a repeating unit of the following Chemical Formula 3.

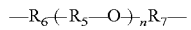

In Chemical Formula 3, $R_5$ is a linear or branched alkylene group having 1 to 10 carbon atoms, n is an integer of 1 to 100, and $R_6$ and $R_7$ may be identical or different and are independently a direct bond, —O—, —NH—, —COO—, or —CONH—.

In the case of manufacturing the base film layer using the copolymer containing a polyamide-based repeating unit and a polyether-based repeating unit, the polyether-based segment may be a polyether-based repeating unit.

Further, the polyether-based segment may be derived from a polymer including polyether-based segments used in the manufacturing process of the base film, or a polyether-based monomer or oligomer.

Meanwhile, the absolute weight average molecular weight of the copolymer containing polyamide-based segments and polyether-based segments may be 50,000 to 300,000, and preferably 110,000 to 250,000.

If the absolute weight average molecular weight of the copolymer is less than 50,000, the manufactured base film layer lacks the mechanical physical properties to be used for an inner liner film, and it is difficult to have good physical properties capable of performing as a gas barrier. If the absolute weight average molecular weight of the copolymer exceeds 300,000, the modulus or the degree of crystallinity of the base film layer is excessively increased when heated at a high temperature, and thus it may be difficult to secure the elasticity or elastic recovery required for the inner liner film.

In the solution containing a polymer material, light scattering is caused by a chain of the polymer material. The absolute weight average molecular weight of the polymer material can be measured by using such a light scattering phenomenon.

In particular, when using the Wyatt's MALS (Multi Angle Light Scattering) system, the absolute weight average molecular weight of the polymer material can be obtained by applying the parameters shown in the measurement result to the Rayleigh-Gans-Debye equation.

<Equation 2: Rayleigh-Gans-Debye Equation>

$$K^*C/R(\theta)=1/MP(\theta)+2A_2C$$

In Equation 2, M is a molar mass, and in the case of polydispersed samples, is an absolute weight average molecular weight (Mw), $R(\theta)$ is the excess Rayleigh ratio, $K^*=4\pi^2 n_0^2(dn/dc)^2\lambda_0^{-4}N_A^{-1}$, C is a polymer concentration in solution (g/ml), and $A_2$ is the second virial coefficient.

Also, in the above $K^*$, $n_0$ is a refractive index of a solvent, $N_A$ is Avogadro's number, $\lambda_0$ is a wavelength of light in vacuum, $P(\theta)=R(\theta)R_0$, and $R_0$ is incident light.

When the polyether-based segment is within the range from 15% to 50% by weight based on the total weight of the film, the above-described copolymer may include the polyamide-based segment and the polyether-based segment in a weight ratio of 1:9 to 9:1.

As described above, if the content of the polyether-based segment is too small, the modulus of the base film layer or the polymer film becomes high and thus the moldability of the tire is reduced or the physical properties may be greatly decreased due to repeated deformations.

If the content of the polyether-based segment is too large, the gas barrier property of the polymer film can be lowered and the reactivity to the adhesive is lowered and thus it may be difficult for the inner liner to adhere easily to a carcass layer. Further, the elasticity of the base film layer is increased and thus it may not be easy to manufacture a uniform film.

Further, in the base film layer, the polyamide-based resin and the copolymer can be included in a weight ratio of 6:4 to 3:7, and preferably 5:5 to 4:6.

If the content of the polyamide-based resin is too small, the density or gas barrier property of the base film layer can be lowered.

Also, if the content of the polyamide-based resin is too large, the modulus of the base film layer may become excessively high or the moldability of the tire may be reduced. Further, in the tire manufacturing process or in the automobile running process, the polyamide-based resin can be crystallized under a high temperature environment, and cracks can be generated due to repeated deformations.

As mentioned above, the polymer film can exhibit improved adhesive strength to an adhesive or an adhesive layer due to the characteristics of the above-described base film. Without the need to laminate an additional adhesive layer or a rubber layer, the polymer film can be firmly and uniformly fixed to a carcass layer with a thin and light weight adhesive layer.

Meanwhile, the base film layer may be an undrawn film.

When the base film layer is in the form of the undrawn film, it has a low modulus and high strain and thus it can be suitably applied to a tire molding process during which high expansion occurs.

Also, in the undrawn film, the crystallization phenomenon hardly occurs and thus it is possible to prevent damage such as cracks due to repeated deformations.

Moreover, in the undrawn film, orientation in a particular direction and deviation in the physical properties are not large, and thus an inner liner having a uniform physical property can be obtained.

As shown in the manufacturing process of the polymer film to be described later, the base film can be manufactured into a non-oriented or undrawn film by a method of suppressing the orientation of the base film layer to the utmost, for example, by adjusting viscosity through the optimization of the melt and extrusion temperature, by changing a nozzle die standard (size), or by controlling a winding speed.

When applying the undrawn film to the base film layer, the film for the inner liner can be easily manufactured in a cylindrical shape or a sheet shape in the tire manufacturing process.

In particular, when applying the undrawn film to the base film layer, it is preferred in that it is not necessary to separately construct a film production facility for each tire size and that impact or wrinkles applied to the film in the transport and storage processes can be minimized.

Further, when manufacturing the base film in sheet form, a step of adding a adhesive layer to be described later can be more easily conducted. Due to the molding drum and standard difference, it is possible to prevent damage or distortion occurring in the manufacturing process.

On the other hand, the base film layer may further include an olefinic polymer compound.

The above-described base film layer uses the olefinic polymer compound together with the polyamide-based resin and the copolymer containing polyamide-based segments and polyether-based segments, and thereby it is possible to prevent the polymer film according to one embodiment from being crystallized due to high temperature or external impact or deformation and the like. Further, while maintaining other mechanical physical properties of the polymer film according to one embodiment at the equivalent or higher levels, the modulus properties are lowered or the elasticity is increased, thus improving fatigue resistance and durability.

Specifically, the olefinic polymer compound serves to improve the ability to increase softness of the base film layer and absorb the impact applied from the outside. Also, the olefinic polymer compound can greatly lower the modulus of the base film layer and also prevent a phenomenon in which the inner structure of the compound or polymer included in the base film layer is changed and crystallized.

The above-described base film layer can include 0.1% by weight to 40% by weight, or 1% by weight to 30% by weight, or 2% by weight to 25% by weight of the olefinic polymer compound.

If the content of the olefinic polymer compound is too small, the functional effect due to the use of the olefinic polymer compound may be slight.

If the content of the olefinic polymer compound is too large, the physical property or effect resulting from the polyamide-based resin and the copolymer can be lowered. Also, by applying the polymer film according to one embodiment to the inner liner film, the moldability in the tire manufacturing process may be lowered.

As the base film layer includes the olefinic polymer compound, even without significantly increasing the content of the polyether-based segments of the copolymer, for example, even if the base film includes the polyether-based segment of the copolymer in an amount of more than 2% by weight and less than 15% by weight, it is possible to provide a polymer film or inner liner film that is capable of achieving high elasticity, durability, and fatigue resistance for a long period of time.

The olefinic polymer compound may contain an olefinic polymer, an olefinic copolymer, a dicarboxylic acid or its acid anhydride-grafted olefinic polymer or copolymer, or mixtures of two or more of these.

The olefinic polymer may include polyethylene, polypropylene, or a mixture thereof.

The olefinic polymer may include an ethylene-propylene copolymer.

As described above, the above-mentioned olefinic polymer compound may include an olefinic polymer or copolymer grafted with a dicarboxylic acid or its acid anhydride, wherein the above dicarboxylic acid can include maleic acid, phthalic acid, itaconic acid, citraconic acid, alkenylsuccinic acid, cis-1,2,3,6-tetrahydrophthalic acid, 4-methyl-1,2,3,6-tetrahydrophthalic acid, or a mixture of two or more of these, and the dianhydrides of the above dicarboxylic acids may be a dicarboxylic acid dianhydride in the example described above.

Among the olefinic polymer or copolymer grafted with a dicarboxylic acid or its acid anhydride, the grafted dicarboxylic acid or its acid anhydride may be contained in an amount of more than 0.05% by weight, and preferably from 0.1% to 50% by weight, or 0.1% to 10% by weight.

The grafting rate of this dicarboxylic acid or its acid anhydride can be determined from the results obtained by titrating the olefinic polymer compound with an acid-base.

For example, about 1 g of the olefinic polymer compound is put in 150 ml of xylene saturated with water and refluxed for 2 h to which a 1 wt % thymol blue-dimethylformamide solution is added in a small amount and then subjected to somewhat excessive titration with a 0.05 N sodium hydroxide-ethyl alcohol solution to thereby obtain a dark blue solution. Then, the resulting solution is subjected to back titration with a 0.05 N hydrochloric acid-isopropyl alcohol solution until it shows yellow, thereby obtaining an acid number. From this acid number, the amount of the dicarboxylic acid grafted on the olefinic polymer compound can be calculated.

The olefinic polymer compound may have a density of 0.820 $g/cm^3$ to 0.960 $g/cm^3$, or 0.840 $g/cm^3$ to 0.920 $g/cm^3$.

On the other hand, the base film may further include additives such as a heat-resistant antioxidant, a thermal stabilizer, an adhesion promoter, or a mixture thereof.

Specific examples of the heat-resistant antioxidant include N,N'-hexamethylene-bis-(3,5-di-tert-butyl-4-hydroxy-hydrocinnamide (e.g., a commercially available products such as Irganox 1098), tetrakis[methylene(3,5-di-(t-butyl)-4-hydroxy-hydrocinnamate)]methane (e.g., a commercially available products such as Irganox 1010), 4,4'-di-cumyl-di-phenylamine (e.g., Naugard 445), and the like.

Specific examples of the thermal stabilizer include benzoic acid, triacetonediamine, N,N'-bis(2,2,6,6-tetramethyl-4-piperidyl)-1,3-benzenedicarboxamide, and the like.

However, the additives are not limited to the above examples, and those known to be usable in the polymer film may be used without any specific limitation.

On the other hand, the adhesive layer including the resorcinol-formalin-latex (RFL)-based adhesive has excellent adhesion and adhesion maintaining performance to the base film layer and a tire carcass layer, and thus it may prevent breaking of the interface between an inner liner film and a carcass layer, which is generated by heat or repeated deformation in a tire manufacturing process or an automobile running process, to impart sufficient fatigue resistance to the polymer film.

It is considered that the main properties of the adhesive layer result from the inclusion of the resorcinol-formalin-latex (RFL)-based adhesive having a specific composition.

Previously, as an adhesive for a tire inner liner, a rubber type of tie gum and the like was used, and thus an additional vulcanization process was required.

On the contrary, since the adhesive layer includes the resorcinol-formalin-latex (RFL)-based adhesive having a specific composition, it has high reactivity and adhesion force to the base film, and it may be compressed under a high temperature heating condition to firmly adhere the base film to a carcass layer without significantly increasing the thickness.

Thus, the weight of a tire may become lighter, the fuel efficiency of automobiles may be improved, and separation between a carcass layer and an inner liner or between the base film and the adhesive layer may be prevented even if deformations occur repeatedly in a tire manufacturing process or in an automobile running process.

Further, since the adhesive layer may exhibit high fatigue resistance to physical/chemical deformations that may occur in a tire manufacturing process or an automobile running process, it may minimize lowering of adhesion force or other physical properties in a manufacturing process under high temperature conditions or in an automobile running process during which mechanical deformation is applied for a long time.

Furthermore, the resorcinol-formalin-latex (RFL)-based adhesive may exhibit good adhesion performance since cross-linkage between latex and rubber is available. The resorcinol-formalin-latex (RFL)-based adhesive is physically a latex polymer and thus has a flexible property like rubber due to low hardness, and a methylol group of the resorcinol-formalin-latex polymer and a base film may be chemically bonded.

Thus, if the resorcinol-formalin-latex (RFL)-based adhesive is applied to a base film, the film having sufficient adhesion performance may be provided.

The resorcinol-formalin-latex (RFL)-based adhesive may include 2% to 32% by weight, preferably 10% to 20% by weight of a condensate of resorcinol and formaldehyde, and 68% to 98% by weight, preferably 80% to 90% by weight of a latex.

The condensate of resorcinol and formaldehyde may be obtained by mixing resorcinol and formaldehyde at a mole ratio of 1:0.3 to 1:3.0, preferably 1:0.5 to 1:2.5, and conducting condensation.

Further, the condensate of resorcinol and formaldehyde may be included in the amount of 2% by weight or more based on the total weight of the adhesive layer in terms of a chemical reaction for excellent adhesion, and it may be included in the amount of 32% by weight or less so as to secure adequate fatigue resistance.

The latex may be selected from the group consisting of natural rubber latex, styrene/butadiene rubber latex, acrylonitrile/butadiene rubber latex, chloroprene rubber latex, and styrene/butadiene/vinylpyridine rubber latex, and a mixture of two or more thereof.

The latex may be included in the amount of 68% by weight or more based on the total weight of the adhesive layer for softness and an effective cross-linking reaction with rubber, and it may be included in the amount of 98% by weight or less for a chemical reaction with the base film and stiffness of the adhesive layer.

Further, the adhesive layer may further include at least one additive such as a surface tension control agent, a heat resistant agent, an antifoaming agent, a filler, and the like, in addition to the condensate of resorcinol and formaldehyde and the latex.

At this time, the surface tension control agent is applied for uniform coating of the adhesive layer, but it may cause a decrease in adhesion when introduced in an excessive amount, and thus it may be included in the amount of 2% by weight or less, or 0.0001% to 2% by weight, preferably 1.0% by weight or less, or 0.0001% to 0.5% by weight, based on the total weight of the adhesive layer.

At this time, the surface tension control agent may be one or more selected from the group consisting of a sulfonic acid salt surfactant, a sulfate ester surfactant, a carboxylic acid salt anionic surfactant, a phosphate ester anionic surfactant, a fluorine-containing surfactant, a silicone-based surfactant, and a polysiloxane-based surfactant.

The adhesive layer may have a thickness of 0.1 µm to 20 µm, preferably 0.1 µm to 19 µm, more preferably 0.2 µm to 7 µm, and still more preferably 0.3 µm to 5 µm, and it may be formed on one side or both sides of a film for a tire inner liner.

If the thickness of the adhesive layer is too thin, the adhesive layer itself may become thinner when a tire is inflated, cross-linking adhesion between a carcass layer and a base film may be lowered, and stress may be concentrated on a part of the adhesive layer to lower the fatigue resistance property.

If the thickness of the adhesive layer is too thick, interface separation may occur in the adhesive layer to lower the fatigue resistance property.

In order to adhere the inner liner film to a carcass layer of a tire, an adhesive layer is generally formed on one side of the base film, but in the case where a multi-layered inner liner film is applied, or adhesion to rubber on both sides is required according to a tire molding method and construction design, for example when an inner liner film covers a bead part, the adhesive layer may be preferably formed on both sides of the base film.

Also, the polymer film can maintain a proper inflation pressure even after it is used for a long period of time. For example, when 90-day internal pressure retention (IPR) of the tire applied to the polymer film is measured at a temperature of 21° C. under a pressure of 101.3 kPa in accordance with the method of the American Society for Testing and Materials standard ASTM F 1112-06, the internal pressure retention may be 95% or more, that is, the internal pressure reduction may be 5% or less, as shown in Equation 3 below.

In this way, when using the above polymer film, a rollover accident or a fuel efficiency degradation caused by a low inflation pressure can be prevented.

[Equation 3]

$$\text{Internal Pressure Retention (\%)} = \{1 - (\text{Tire inflation pressure upon initial testing} - \text{Tire inflation pressure after having been left for 90 days})/(\text{Tire inflation pressure upon initial testing})\} \times 100$$

$$\text{공기압 유지율 (\%)} = \left\{1 - \frac{(\text{최초 평가시 타이어 공기압} - 90일간 방치후 타이어 공기압)}{(\text{최초 평가시 타이어 공기압})}\right\} \times 100$$

Details of the method for manufacturing the polymer film according to one embodiment described above are as follows.

The polyamide-based resin can be included in the base film by mixing or compounding with the above-described copolymer and then melting them. Also, the polyamide-based resin can be included in the base film by mixing a precursor monomer or oligomer and the like of the polyamide-based resin with the above-described copolymer along with a reaction initiator or catalyst and subjecting them to reaction.

Further, the copolymer containing polyamide-based segments and polyether-based segments can be included in the base film by mixing or compounding the copolymer itself with the polyamide-based resin and then melting them.

In addition, a polymer containing polyamide-based segments and a polymer containing polyether-based segments are mixed or compounded and the mixture or compound is subjected to a polymerization reaction or cross-linking reaction. Then, the product from the polymerization reaction or cross-linking reaction can be mixed with the polyamide-based resin and melted to thereby form the base film layer.

Further, a polymer containing polyamide-based segments and a polymer containing polyether-based segments are mixed or compounded. The mixture or compound is then mixed with the polyamide-based resin and melted. Therefore, the two kinds of polymers may cause a polymerization reaction or cross-linking reaction. By doing so, the base film layer can be formed.

In the above-described base film, the polyamide-based resin and the copolymer containing polyamide-based segments and polyether-based segments are uniformly mixed, or they can be in a state of being combined over a part or an entire region through the polymerization reaction or cross-linking reaction.

On the other hand, in the step of forming the base film layer, in order to extrude the film having a more uniform thickness, the copolymer and the polyamide-based resin can be adjusted to have a uniform size.

Thus, by adjusting the size of the copolymer and the polyamide-based resin, the copolymer and the polyamide-based resin can be more uniformly mixed in the step of mixing them, the step of staying in the material supply portion which is maintained at a constant temperature, or the step of melting or extrusion and the like. It is thereby possible to prevent a phenomenon in which the copolymer and the polyamide-based resin are agglomerated alone or together and thus the size is increased. Thus, the base film layer having a more uniform thickness may be formed.

When the copolymer and the polyamide-based resin have a similar size, it is possible to minimize the phenomenon in which raw chips are agglomerated together or uneven shapes or areas appear in the subsequent steps of mixing, melting, or extrusion. Thus, it is possible to form the base film having a uniform thickness over the entire area of the film.

On the other hand, the manufacturing method of the polymer film may further include a step of mixing the polyamide-based resin and the copolymer in a weight ratio of 6:4 to 3:7.

If the content of the polyamide-based resin is too small, the density or gas barrier property of the base film layer can be lowered.

Further, if the content of the polyamide-based resin is too large, the modulus of the base film layer may become excessively high or the moldability of the tire may be reduced. Also, in the tire manufacturing process or in the automobile running process, the polyamide-based resin can be crystallized under a high temperature environment, and cracks can be generated due to repeated deformations.

In this mixing step, any apparatus or method known to be usable in the mixing of the polymer film may be used without any limitation.

The polyamide-based resin and the copolymer can be mixed and then injected in a raw material feeder, and they may be successively or simultaneously injected into the raw material feeder and then mixed.

As described above, the above-described copolymer can include a polyamide-based segment and a polyether-based segment in a weight ratio of 1:9 to 9:1.

The mixture of the polyamide-based resin and the copolymer may be fed into the extrusion die by way of the raw material feeder which is maintained at a temperature of 50° C. to 100° C.

As the raw material feeder is maintained at a temperature of 50° C. to 100° C., the mixture of the polyamide-based resin and the copolymer can have the physical properties such as appropriate viscosity and thus can be moved easily to the extrusion die or other parts of the extruder. Moreover, it is possible to prevent a phenomenon of raw material feeding failure caused by agglomeration of the mixture and the like. Further, in subsequent melting and extruding processes, the more uniform base film can be formed.

The raw material feeder is a part which serves to feed the raw material injected in an extruder or an extrusion die or other part, and its construction is not particularly limited. This raw material feeder may be a conventional raw material feeder which is included in an extruder for the production of a polymer resin.

On the other hand, the mixture supplied to an extrusion die through the raw material feeder can be melted and extruded at a temperature of 230° C. to 300° C., thereby forming a base film layer.

The temperature for melting the mixture may be 230° C. to 300° C. and preferably 240° C. to 280° C.

The melting temperature should be higher than the melting point of the polyamide-based compound. However, if the melting temperature is too high, carbonization or decomposition can occur to decrease the physical properties of the film. Also, coupling between the polyether-based resins or orientation in a fiber arrangement direction may occur and thus it may be disadvantageous to prepare an undrawn film.

Any extrusion die known to be usable for extrusion of a polymer resin may be used without specific limitation, but it is preferable to use a T-type die so as to make the thickness of the base film uniform or prevent occurrence of the orientation in the base film.

Meanwhile, the step of forming a base film layer may further include a step of extruding a mixture of the polyamide-based resin and the copolymer containing polyamide-based segments and polyether-based segments as a film having a thickness of 30 μm to 300 μm.

Adjustment of the thickness of the manufactured film can be conducted by changing the extrusion conditions, for example, by adjusting the discharge amount of the extruder or the gap of the extrusion die, or by changing a winding speed in the cooling process or recovery process of the extrudate.

The mixture of the polyamide-based resin and the copolymer containing polyamide-based segments and polyether-based segments may further include the above-described olefinic polymer compound.

Details of the olefinic polymer compound are as described above.

In order to more uniformly adjust the thickness of the base film layer in the range of 30 μm to 300 μm, the die gap of the extrusion die may be adjusted to 0.3 mm to 1.5 mm.

In the step of forming the base film, if the die gap is too small, the shear pressure of the extrusion die in the melting and extrusion processes becomes too high and its shear stress becomes high. Therefore, there may be problems in that it is difficult to make a uniform form of the film extruded and also that productivity is lowered. Further, if the die gap is too large, drawing of the melt-extruded film becomes excessively high and thus orientation may occur, and a difference in the physical properties between the vertical and horizontal directions of the base film to be manufactured may be increased.

Furthermore, in the method for manufacturing the polymer film, the thickness of the base film manufactured by the above-mentioned steps is continuously measured, and the measurement result is fed back to control the part of the extrusion die corresponding to the position where non-uniform thickness appears, for example, a lip gap adjustment bolt of a T-die, thus reducing deviation of the manufactured base film, thereby obtaining a film having more uniform thickness.

The measurement of the film thickness-feedback-control of the extrusion die may constitute an automated process step by using an automated system, for example the Auto Die system, and the like.

Meanwhile, the manufacturing method of the polymer film may further include a step of solidifying the base film layer formed through melting and extrusion in a cooling part maintained at a temperature of 5° C. to 40° C., and preferably 10° C. to 30° C.

By solidifying the base film layer formed through melting and extrusion in a cooling part maintained at a temperature of 5° C. to 40° C., a film having a more uniform thickness may be provided.

If the base film layer formed through melting and extrusion is folded and adhered to a cooling part maintained at the appropriate temperature, orientation may not substantially occur, and the base film layer may be provided as an undrawn film.

Specifically, the solidifying step may include a step of uniformly adhering the base film formed through melting and extrusion to a cooling roll maintained at a temperature of 5° C. to 40° C., using an air knife, an air nozzle, an electrostatic charging device (pinning device), or a combination thereof.

In the solidifying step, by adhering the base film formed through melting and extrusion to a cooling roll using an air knife, an air nozzle, an electrostatic charging device (pinning device), or a combination thereof, blowing of the more uniform thickness may be formed, and areas having a relatively thick or thin thickness compared to the surrounding parts in the film may not be substantially formed.

Meanwhile, the melted material extruded under the specific die gap conditions may be attached or folded to a cooling roll installed at a horizontal distance of 10 mm to 150 mm, and preferably 20 mm to 120 mm, from the die outlet, to eliminate drawing and orientation.

The horizontal distance from the die outlet to the cooling roll may be a distance between the die outlet and a position where discharged melted material is folded to the cooling roll.

If the linear distance between the die outlet and a point where melted material is folded to the cooling roll is too small, it may interfere with the uniform flow of the melt-extruded resin film and thus the film can be unevenly cooled. If the distance is too large, the effect of suppressing the drawing of the film cannot be achieved.

In the step of forming the base film, except for the above-described steps and conditions, film extrusion conditions commonly used for manufacturing of a polymer film, for example, screw diameter, screw rotation speed, line speed, and the like may be appropriately selected.

The method for manufacturing the polymer film may further include a step of coating a resorcinol-formalin-latex (RFL)-based adhesive on at least one side of the base film.

The step of forming the adhesive layer may be performed by coating the resorcinol-formalin-latex (RFL)-based adhesive on one side or both sides of the base film, and then drying it. The formed adhesive layer may have a thickness of 0.1 μm to 20 μm, and preferably 0.1 μm to 10 μm.

The resorcinol-formalin-latex (RFL)-based adhesive may include 2% to 32% by weight of a condensate of resorcinol and formaldehyde, and 68% to 98% by weight, and preferably 80% to 90% by weight of latex.

That is, the step of forming the adhesive layer may include a step of coating an adhesive including 2% to 30% by weight of a condensate of resorcinol and formaldehyde, and 69% to 98% by weight of a latex on at least one side of the base film to a thickness of 0.1 μm to 20 μm.

More details of the resorcinol-formalin-latex (RFL)-based adhesive having the above specific composition are as described above.

Commonly used coating methods or apparatuses may be used to coat the adhesive without specific limitation, but knife coating, bar coating, gravure coating, spray coating, or immersion may be used.

However, knife coating, gravure coating, or bar coating may be preferable in terms of uniform coating of the adhesive.

After forming the adhesive layer on one side or both sides of the base film, drying and adhesive reaction may be simultaneously conducted, but a heat treatment reaction step may be conducted after undergoing a drying step in consideration of the reactivity of the adhesive, and the step of forming the adhesive layer and drying and reacting it may be conducted several times for application of a thickness of the adhesive layer or a multi-layered adhesive.

After coating the adhesive on the base film, a heat treatment reaction may be conducted by the method of solidification and reaction at a temperature of 100° C. to 150° C. for approximately 30 s to 3 min.

In the step forming the copolymer or mixture or in the step of melting or extruding the copolymer, adhesives such as a heat-resistance antioxidant or a thermal stabilizer can be further added.

Details of the additives are as described above.

Advantageous Effect of the Invention

There can be provided a polymer film which imparts an excellent gas barrier property even to tires having a relatively thin thickness so that weight of the tire can be reduced and the fuel efficiency of automobiles can be improved, and which obtains excellent moldability and mechanical properties while having high hear resistance properties, and a method for manufacturing the same can be provided.

BRIEF DESCRIPTION OF THE DRAWINGS

FIG. 1 schematically shows the structure of a tire.

DETAILED DESCRIPTION OF THE EMBODIMENTS

Specific embodiments of the invention will be explained in detail in the following examples. However, these examples are only to illustrate specific embodiments of the invention, and the scope of the invention is not limited thereto.

Example: Manufacture of a Polymer Film

Example 1

(1) Manufacturing of a Base Film

A polyamide-based resin (nylon 6) having a relative viscosity (96% sulfuric add solution) of 3.3, a copolymer resin having an absolute weight average molecular weight of 145,000 (synthesized using 45% by weight of polyethylene glycol having a terminal amine group and 55% by weight of nylon 6 resin), and a maleic anhydride-grafted (0.7 wt %) ethylene-propylene copolymer (density: 0.870 g/cm$^3$) were mixed with a weight ratio of 4:4:2.

At this time, the raw material feeder was adjusted to a temperature of 50° C. to 100° C. and then the above mixture was supplied to an extrusion die, while preventing the mixture from being fused in an extruder screw and thus causing a feeding failure.

Then, the supplied mixture was extruded through a T-type die (die gap–1.0 mm) at a temperature of 260° C. while maintaining uniform flow of melted resin. The extruded melted resin was cooled and solidified into a film with a uniform thickness using an air knife on the surface of a cooling roll that was controlled to 25° C.

Subsequently, a undrawn base film having a thickness of 100 μm was obtained without going through the drawing and heat treatment section at a speed of 15 m/min.

(2) Coating of Adhesive

Resorcinol and formaldehyde were mixed at a mole ratio of 1:2, and then subjected to a condensation reaction to obtain a condensate of resorcinol and formaldehyde.

12% by weight of the condensate of resorcinol and formaldehyde and 88% by weight of styrene/butadiene-1,3/vinylpyridine latex were mixed to obtain a resorcinol-formalin-latex (RFL)-based adhesive with concentration of 20%.

The resorcinol-formalin-latex (RFL)-based adhesive was coated on the base film to a thickness of 1 μm using a gravure coater, and dried and reacted at 150° C. for 1 min to form an adhesive layer.

Example 2

(1) Manufacturing of a Base Film

The base film was manufactured in the same manner as in Example 1, except that a polyamide-based resin (nylon 6) having a relative viscosity (96% sulfuric add solution) of 3.3, a copolymer resin having an absolute weight average molecular weight of 145,000 (synthesized using 45% by weight of polyethylene glycol having a terminal amine group and 55% by weight of nylon 6 resin), and a maleic anhydride-grafted (0.7 wt %) ethylene-propylene copolymer (density: 0.870 g/cm$^3$) were mixed with a weight ratio of 3.5:6.5:2.

(2) Coating of Adhesive

The adhesive layer was formed on the manufactured base film by the same method as in Example 1.

Comparative Example: Manufacture of a Polymer Film

Comparative Example 1

(1) Manufacturing of a Base Film

The base film was manufactured in the same manner as in Example 1, except that nylon 6 resin having a relative viscosity (96% sulfuric acid solution) of 2.54 was used.

(2) Coating of Adhesive

The adhesive layer was formed on the above manufactured base film by the same method as in Example 1.

Comparative Example 2

(1) Manufacturing of a Base Film

The base film was manufactured by the same method as in Example 2, except that nylon 6 resin having a relative viscosity (96% sulfuric acid solution) of 2.54 was used.

(2) Coating of Adhesive

The adhesive layer was formed on the above manufactured base film by the same method as in Example 1.

Comparative Example 3

(1) Manufacturing of a Base Film

The base film was manufactured by the same method as in Example 1, except that 50% by weight of a polyamide-based resin (nylon 6) having a relative viscosity (96% sulfuric acid solution) of 3.3, and 50% by weight of a copolymer resin having an absolute weight average molecular weight of 150,000 (synthesized using 80% by weight of polyethylene glycol having a terminal amine group and 20% by weight of nylon 6 resin) were mixed.

(2) Coating of Adhesive

The adhesive layer was formed on the above manufactured base film by the same method as in Example 1.

Comparative Example 4

(1) Manufacturing of a Base Film

The base film was manufactured by the same method as in Example 1, except that 50% by weight of a polyamide-based resin (nylon 6) having a relative viscosity (96% sulfuric acid solution) of 2.54, and 50% by weight of a copolymer resin having an absolute weight average molecular weight of 150,000 (synthesized using 80% by weight of polyethylene glycol having a terminal amine group and 20% by weight of nylon 6 resin) were mixed.

(2) Coating of Adhesive

The adhesive layer was formed on the above manufactured base film by the same method as in Example 1.

Experimental Example: Measurement of Physical Properties of a Polymer Film

Experimental Example 1: Measurement of Melt Viscosity

The melt viscosities of the nylon 6 and the copolymer resin used in the examples and comparative examples, respectively, were measured at orifice diameter 1 mm*length 20 mm at a temperature of 260° C. and a shear rate shown in Table 1 below, using a Rheo-Tester 2000 (GOTTFERT GMBH).

The ratio of the melt viscosity of the copolymer to the melt viscosity of the polyamide-based resin was obtained from the above measured melt viscosity.

The results are shown in Table 1 below.

TABLE 1

Results of experiment 1

| | Ratio of the melt viscosity of the copolymer to the melt viscosity of the polyamide-based resin (260° C.) Shear rate | | | |
|---|---|---|---|---|
| | 100 s$^{-1}$ | 500 s$^{-1}$ | 1000 s$^{-1}$ | 2000 s$^{-1}$ |
| Example 1 | 1.029 | 0.746 | 0.685 | 0.672 |
| Example 2 | 1.040 | 1.762 | 0.718 | 0.702 |
| Comparative Example 1 | 3.285 | 1.710 | 1.373 | 1.196 |
| Comparative Example 2 | 4.910 | 2.374 | 1.863 | 1.539 |
| Comparative Example 3 | 0.923 | 0.686 | 0.639 | 0.628 |
| Comparative Example 4 | 2.692 | 1.574 | 1.294 | 1.125 |

Experimental Example 2: Oxygen Permeability Test

The oxygen permeability of each film for a tire inner liner obtained in the examples and comparative examples was measured.

The specific measurement method thereof is as follows.

(1) Oxygen permeability: measured at 25° C. under a 60 RH % atmosphere using an Oxygen Permeation Analyzer (Model 8000, Illinois Instruments product) according to ASTM D 3895.

Experimental Example 3: Measurement of Internal Pressure Retention

The tire was manufactured using the tire inner liner films of the examples and comparative examples according to the standard 205R/65R16.

Then, 90-day internal pressure retention according to the following Equation 3 was measured at a temperature of 21° C. under a pressure of 101.3 kPa in accordance with ASTM F1112-06.

Internal Pressure Retention (%)={1−(Tire inflation pressure upon initial testing−Tire inflation pressure after having been left for 90 days)/(Tire inflation pressure upon initial testing)}×100   [Equation 3]

The results of Experimental Example 2 and Experimental Example 3 are shown in Table 2 below.

TABLE 2

Results of Experimental Examples 2 and 3

| | Oxygen permeability | Internal pressure retention |
|---|---|---|
| | Unit | |
| | cc/(m$^2$ · 24 h · atm) | % |
| Example 1 | 83 | 1.5 |
| Example 2 | 98 | 1.7 |
| Comparative Example 1 | 70 | 1.4 |
| Comparative Example 2 | 109 | 1.9 |
| Comparative Example 3 | 40 | 1.2 |
| Comparative Example 4 | 50 | 1.1 |

Experimental Example 4: Determination of the Ease of Molding

The tire was manufactured using the tire liner film of the examples and comparative examples according to the standard 205R/65R16.

In the method for manufacturing a tire, a green tire was manufactured and then the manufacturing ease and appearance were evaluated. Then, after vulcanization, the final appearance of the tire was observed.

In this case, when there was no distortion in a green tire or a the after vulcanization and a standard deviation of diameter was within 5%, it was evaluated as "good".

Also, when distortion was generated in a green tire or a tire after vulcanization and thus the tire was not properly made or the tire inner liner was melted or torn and broken or when a standard deviation of diameter was greater than 5%, it was evaluated as "poor form".

Experimental Example 5: Measurement of Durability

The durability of the tires was evaluated while increasing a load using an FMVSS139 tire durability measurement method.

The durability measurement was conducted by two methods of an endurance test wherein a load was increased by a step load, and a high speed test wherein speed was increased, to thereby verify the presence of cracks in the inside of the tire. When there were no cracks, it was indicated as "good", and when cracks incurred, it was indicated as "crack".

The results of the Experimental Examples 4 and 5 are shown in Table 3 below.

TABLE 3

Results of Experimental Examples 4 and 5

| | Manufacturing state of a green tire/state of a final tire | Durability measurement (Endurance test) | Durability measurement (High speed test) |
|---|---|---|---|
| Example 1 | Good/good | Good | Good |
| Example 2 | Good/good | Good | Good |
| Comparative Example 1 | Good/bad form | Crack | rack |
| Comparative Example 2 | Good/bad form | Crack | rack |
| Comparative Example 3 | Bad form/bad form | — | — |
| Comparative Example 4 | Bad form/bad form | — | — |

As shown in Table 1 above, the tire inner liner films of Examples 1 and 2 obtained using a polyamide-based resin having a relative viscosity (96% sulfuric acid solution) of 3.3 and a particular copolymer resin (the polyether-based segments are contained in an amount of 22.5% by weight and 39% by weight, respectively, based on the total weight of the based film) showed that a ratio of the melt viscosity (at 260° C.) of the copolymer to the melt viscosity of the polyamide-based resin ranges from 1.0 to 2.0 at a shear rate of 100 s$^{-1}$, from 0.7 to 1.5 at a shear rate of 500 s$^{-1}$, from 0.65 to 1.2 at a shear rate of 1000 s$^{-1}$, and from 0.65 to 1.1 at a shear rate of 2000 s$^{-1}$.

In addition, in Examples 1 and 2, the polyamide-based resin and the copolymer were uniformly kneaded with each other and melted and thus a base film layer having uniform physical properties in the entire area of the film could be formed. Further, as confirmed from the results of Experimental Example 2 and 3 in Table 2, the polymer films of the examples using the base film layer not only have excellent moldability but also high gas barrier property and internal pressure retention performance.

In contrast, in Comparative Examples 1, 2, and 4, it was confirmed that that a ratio of the melt viscosity of the copolymer to the melt viscosity of the polyamide-based resin is greater than 2.5 at a shear rate of 100 s$^{-1}$ and a temperature of 260° C., greater than 1.5 at a shear rate of 500 s$^{-1}$ and a temperature of 260° C., greater than 1.2 at a shear rate of 1000 s$^-$ and a temperature of 260° C., and greater than 1.1 at a shear rate of 2000 s$^{-1}$ and a temperature of 260° C.

In other words, if the polyamide-based resin and the copolymer used in Comparative Examples 1, 2, and 4 were kneaded to form a base film layer, the mixing was not easy due to a great difference in the melt density, and a phase separation phenomenon between the two components could occur.

As confirmed from the results of Experimental Examples 2 and 3, the polymer film obtained in Comparative Examples 1, 2, and 4 had problems in that moldability was significantly diminished even when a tire was actually made and tested, and that cracks were generated when a durability test was conducted.

Further, in the case of Comparative Example 3, it was confirmed that a ratio of the melt viscosity of the copolymer to the melt viscosity of the polyamide-based resin was less than 1.0 at a shear rate of 100 s$^{-1}$ and a temperature of 260° C., less than 0.7 at a shear rate of 500 s$^{-1}$ and a temperature of 260° C., and less than 0.65 at a shear rate of 1000 s$^{-1}$ and a temperature of 260° C.

In other words, if the polyamide-based resin and the copolymer used in Comparative Example 3 were kneaded to form a base film layer, the mixing is not easy due to a great difference in the melt density, and the phase separation phenomenon between the two components could occur.

Further, in the case of Comparative Example 3, like other comparative examples, it was confirmed from the results of Experimental Examples 2 and 3 that moldability was significantly diminished even when a tire was actually molded and also that the desired gas barrier property and internal pressure retention performance were not obtained.

What is claimed is:
1. A polymer film which comprises:
   a base film layer comprising a polyamide-based resin having a relative viscosity (96% sulfuric acid solution) of 3.0 to 3.5, an olefinic polymer compound, and a copolymer comprising a polyamide-based segment and a polyether-based segment; and
   an adhesive layer formed on at least one side of the base film layer and containing resorcinol-formalin-latex (RFL)-based adhesive,
   wherein a content of the polyether-based segment of the copolymer is more than 2% by weight and less than 15% by weight with respect to the total weight of the base film layer, and
   wherein a ratio of a melt viscosity of the copolymer to a melt viscosity of the polyamide resin is 0.60 to 1.2 at a shear rate of 1000 s–1 and a temperature of 260° C., and
   the olefinic polymer compound includes a dicarboxylic acid or its acid anhydride-grafted olefinic polymer or copolymer,
   wherein the polyamide-based resin, the copolymer, and the olefinic polymer compound, respectively are included in a weight ratio of 2:2:1 to 3.5:6.5:2 in the base film layer.
2. The polymer film of claim 1, wherein the polymer film is used for a tire inner liner.
3. The polymer film of claim 1, wherein the ratio of the melt viscosity of the copolymer to the melt viscosity of the polyamide resin is 1.0 to 2.0 at a shear rate of 100 s–1 and a temperature of 260° C.
4. The polymer film of claim 1, wherein the ratio of the melt viscosity of the copolymer to the melt viscosity of the polyamide resin is 0.60 to 1.1 at a shear rate of 2000 s–1 and a temperature of 260° C.
5. The polymer film of claim 1, wherein the ratio of the melt viscosity of the copolymer to the melt viscosity of the polyamide resin is 0.7 to 1.5 at a shear rate of 500 s–1 and a temperature of 260° C.
6. The polymer film of claim 1, wherein the grafted dicarboxylic acid or its acid anhydride is contained in an amount of 0.1% to 10% by weight.
7. The polymer film of claim 1, wherein the base film layer includes 0.1% by weight to 40% by weight of the olefinic polymer compound.
8. The polymer film of claim 1, wherein the relative viscosity (96% sulfuric acid solution) of the polyamide-based resin is 3.2 to 3.4.
9. The polymer film of claim 1, wherein the absolute weight average molecular weight of the copolymer containing polyamide-based segments and polyether-based segments is 50,000 to 300,000.
10. The polymer film of claim 1, wherein the polyamide-based segment includes a repeating unit of the following Chemical Formula 1 or Chemical Formula 2:

[Chemical Formula 1]

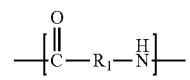

wherein, in Chemical Formula 1, R$_1$ is a linear or branched alkylene group having 1 to 20 carbon atoms, an arylene group having 6 to 20 carbon atoms, or a linear or branched arylalkylene group having 7 to 20 carbon atoms; and

[Chemical Formula 2]

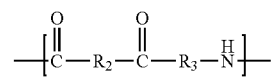

wherein, in Chemical Formula 2, R$_2$ is a linear or branched alkylene group having 1 to 20 carbon atoms, and R$_3$ is a linear or branched alkylene group having 1 to 20 carbon atoms, an arylene group having 6 to 20 carbon atoms, or a linear or branched arylalkylene group having 7 to 20 carbon atoms.
11. The polymer film of claim 1, wherein the polyether-based segment of the copolymer includes a repeating unit of the following Chemical Formula 3:

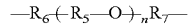 [Chemical Formula 3]

wherein, in Chemical Formula 3,
R$_5$ is a linear or branched alkylene group having 1 to 10 carbon atoms, n is an integer of 1 to 100, and $R_6$ and $R_7$ may be identical or different, and are independently a direct bond, —O—, —NH—, —COO—, or —CONH—.

12. The polymer film of claim 1, wherein the copolymer includes the polyamide-based segment and the polyether-based segment in a weight ratio of 1:9 to 9:1.

13. The polymer film of claim 1, wherein the base film layer has a thickness of 30 μm to 300 μm, and the adhesive layer has a thickness of 0.1 μm to 20 μm.

14. The polymer film of claim 1, wherein the base film layer is an undrawn film.

15. The polymer film of claim 1, wherein the resorcinol-formalin-latex (RFL)-based adhesive includes 2% to 30% by weight of a condensate of resorcinol and formaldehyde and 68% to 98% by weight of a latex.

* * * * *